(12) United States Patent  
Forman et al.

(10) Patent No.: US 8,165,972 B1  
(45) Date of Patent: Apr. 24, 2012

(54) DETERMINING A FEATURE RELATED TO AN INDICATION OF A CONCEPT USING A CLASSIFIER

(75) Inventors: George Henry Forman, Port Orchard, WA (US); Henri Jacques Suermondt, Sunnyvale, CA (US); James Richard Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1419 days.

(21) Appl. No.: 11/113,251

(22) Filed: Apr. 22, 2005

(51) Int. Cl.
*G06N 5/00* (2006.01)
(52) U.S. Cl. ............................................. 706/12; 706/45
(58) Field of Classification Search ................. 382/161, 382/173; 706/12, 45; 715/513; 707/2
See application file for complete search history.

(56) References Cited

U.S. PATENT DOCUMENTS

| | | | | |
|---|---|---|---|---|
| 5,390,259 A | * | 2/1995 | Withgott et al. | 382/173 |
| 5,594,809 A | * | 1/1997 | Kopec et al. | 382/161 |
| 5,913,205 A | * | 6/1999 | Jain et al. | 1/1 |
| 5,924,105 A | * | 7/1999 | Punch et al. | 715/513 |
| 6,996,268 B2 | | 2/2006 | Megiddo et al. | |

* cited by examiner

*Primary Examiner* — Wilbert L Starks

(57) ABSTRACT

A related feature determination system determines a feature related to an indication of a concept. A set of positive cases and a set of negative case are selected using the indication of a concept. A classifier is induced for the concept using the set of positive cases in a manner blinded to the indication of a concept. The set of negative cases is applied to the classifier. A feature related to the indication of a concept is determined using results of applying the classifier to the set of negative cases.

34 Claims, 8 Drawing Sheets

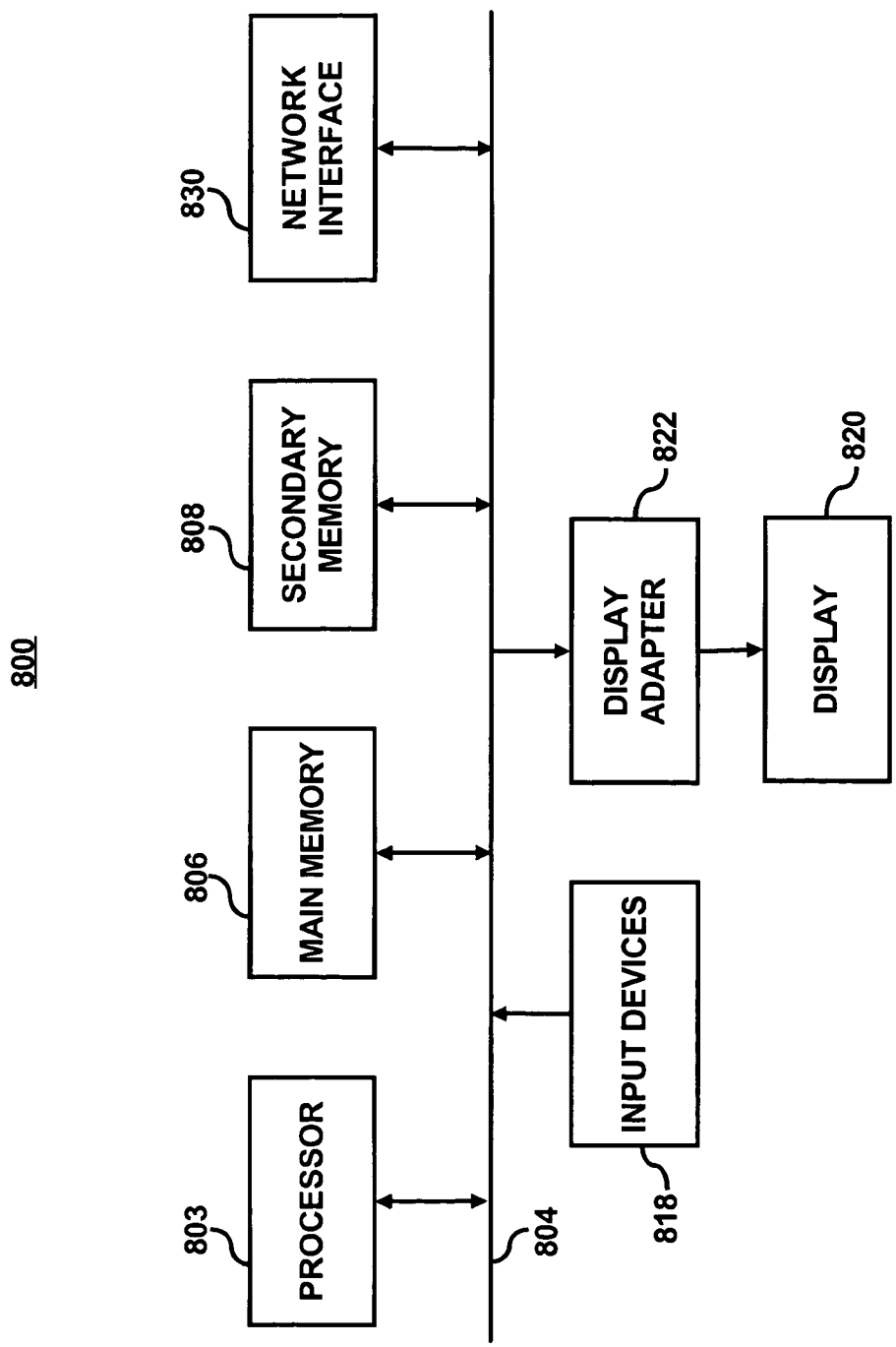

US 8,165,972 B1

DETERMINING A FEATURE RELATED TO AN INDICATION OF A CONCEPT USING A CLASSIFIER

TECHNICAL FIELD

The technical field relates generally to using a classifier to determine a related feature.

BACKGROUND

When searching for documents on a certain topic, a user may not be aware of certain key words that are used in the domain which could complement the query. For example, a user may generate a query including "browser" in the query, but the user may not be aware that many of the documents in the document database only refer to "browser" as "NETSCAPE" or "MOZILLA". Thus, the results of the search may be substantially incomplete. To get a more complete query, the user would need to replace the term "browser" with the expression "(browser or MOZILLA or NETSCAPE) ". The difficulty is for the user to recognize or learn that "MOZILLA" or "NETSCAPE" is a commonly used term related to "browser" in the search space.

Some conventional search interfaces include a capability to expand a single input query term to a list of known synonyms. For example, if the user's query contains "sofa", then the search interface may automatically expand the query to "(sofa or couch or settee or CHESTERFIELD or DAVENPORT)". To achieve this functionality, the search software requires a database of related words, which is composed by human editors. However, the related words must be discovered, which may be a manual, expensive process. The discovery process is compounded by the fact that word or phrase usage is specialized in many different technical domains.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 8 illustrates a computer system, according to an embodiment.

DETAILED DESCRIPTION

For simplicity and illustrative purposes, the principles of the embodiments are described. Moreover, in the following detailed description, references are made to the accompanying figures, which illustrate specific embodiments. Changes may be made to the embodiments without departing from the spirit and scope of the embodiments.

Figure 1:
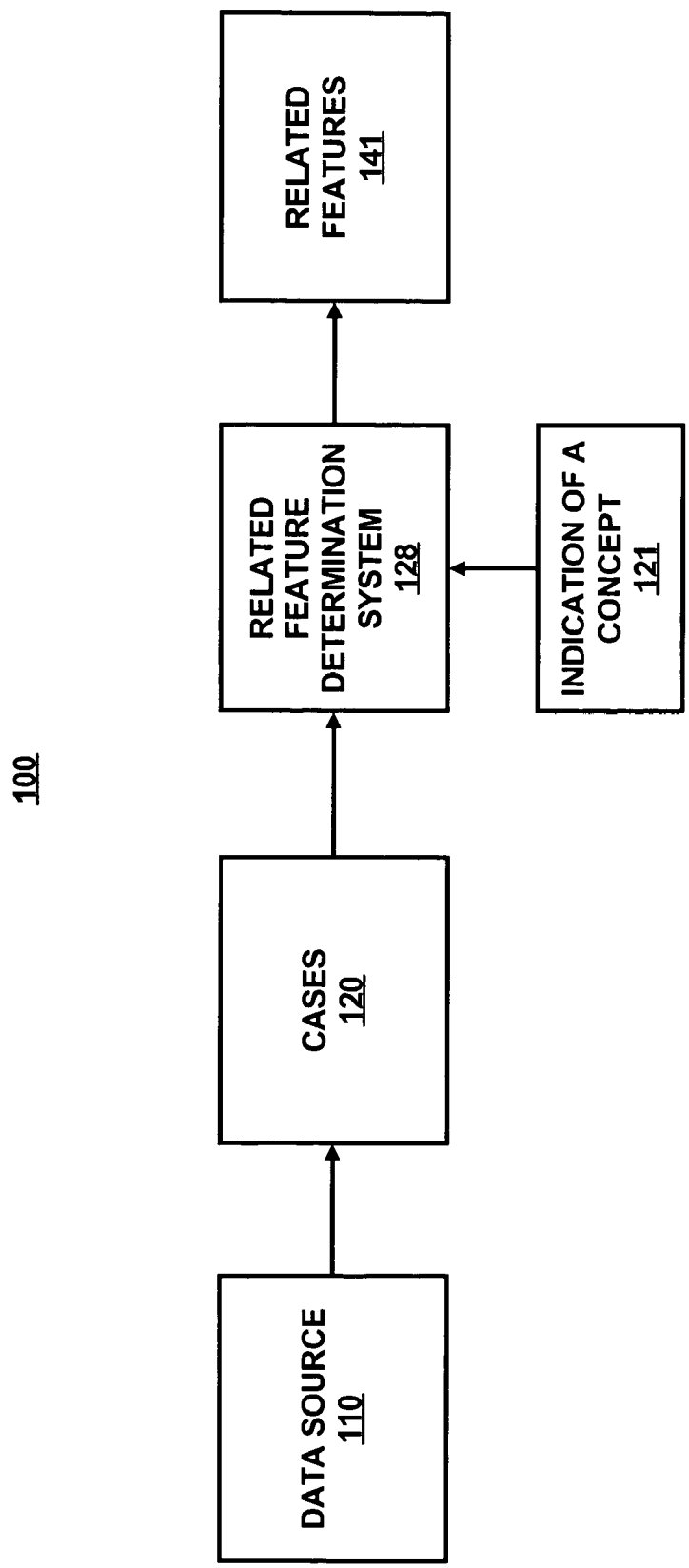
FIG. 1 illustrates a related feature determination system, according to an embodiment.

FIG. 1 illustrates a system 100 according to an embodiment that is operable to determine related features for concepts. The system 100 includes a related feature determination system 128 operable to determine related features for a concept. A concept, for example, is an idea derived or inferred from specific instances or occurrences. A concept is represented, described or indicated, for example, using one or more words or symbols. A feature is a property of something. In one example, a feature is a measurable property of a case used for machine learning. For example, a measurable property is the number of words in a text description or whether a particular word or lexically stemmed root word occurs in the text description. With respect to a given concept, an example of a related feature is a feature that is correlated with cases that belong within the concept as compared to cases that are not within the concept. For example, the word phrase "free money" is a feature related to the concept of spam email and not normal email.

Figure 2:
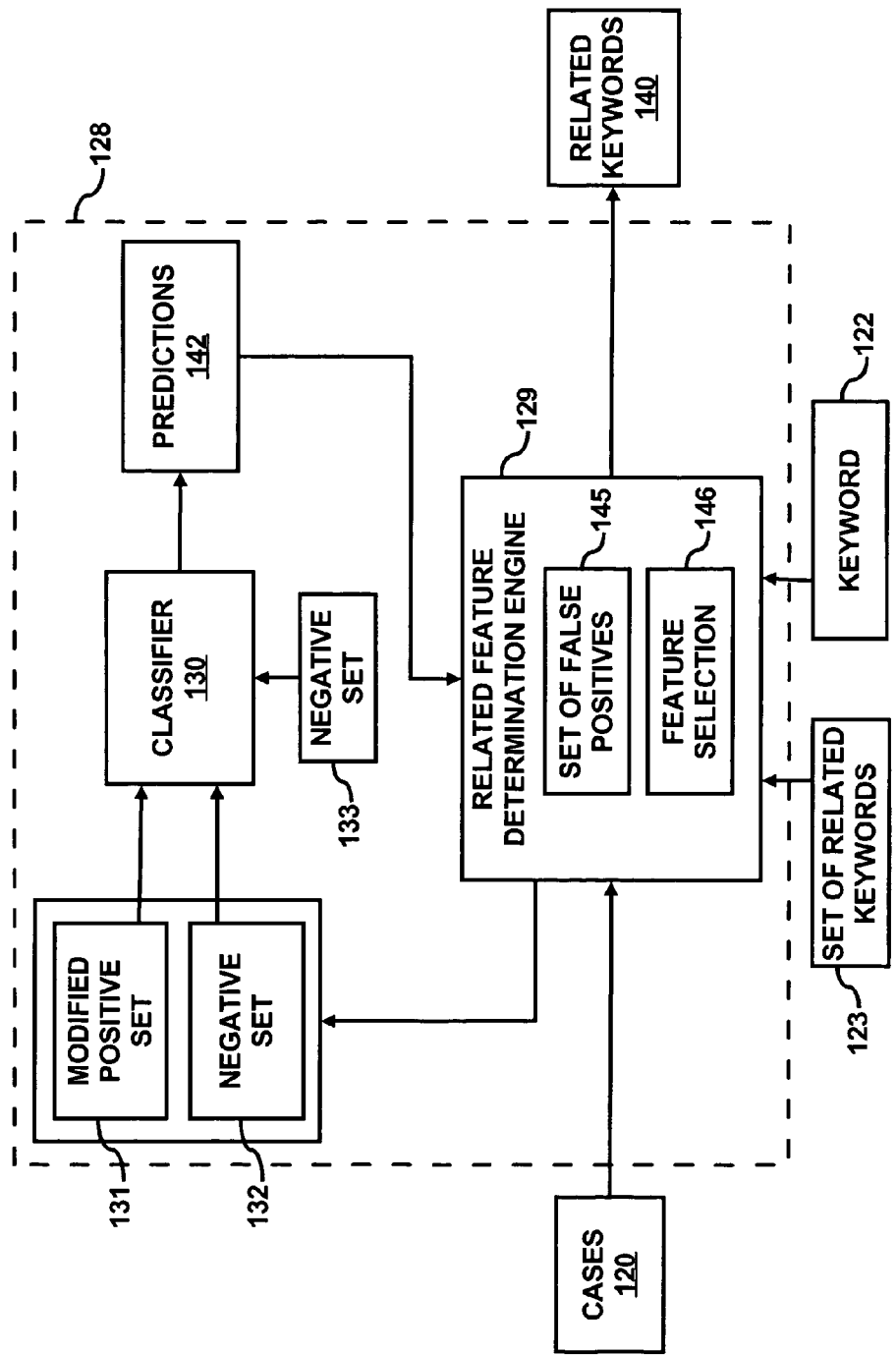
FIG. 2 illustrates a block diagram of a related feature determination engine, according to an embodiment.

The related feature determination system 128 is operable to use machine learning to determine the related features, such as described in detail with respect to FIG. 2.

The related feature determination system 128 receives cases 120 from a data source 110. The data source 110 includes a database or another type of data store. The data source 110 stores any type of data, such as documents, payroll data, web surfing data, user profiles, short text entries, and the like. Data in the data source 110 is, for example, represented as cases 120 for classification or for determining related features 141. The cases 120 include data for training a classifier as well as data from which related features are identified. The cases 120 are data in the data source 110 or a representation of the data in the data source 110, whereby the representations are also stored in the data source 110. A plurality of attributes is, for example, used to represent the data. As known in the field of text classification in machine learning, a document is, for example, represented using attributes, such as number of words in the document, frequency of specific words, and the like. Attribute values for each attribute are stored as a vector for each document. Thus, each of the cases 120 is, for example, represented by a vector of attribute values for a predetermined set of attributes. In other embodiments, other representations of the data in the data source 110 are used.

The related feature determination system 128 also receives an indication of a concept 121. The indication of a concept 121 is a representation of concept for which the system 100 is used to determine related features. Examples of an indication of a concept include one or more keywords and phrases. A keyword is one or more characters, such as letters, words or symbols. Examples of a keyword include a word, an abbreviation, or any set of characters used by itself or with other keywords to represent an indication of a concept. In one example, a keyword is used in a search, such as a word in a query.

The related feature determination system 128 determines the related features 141 from the cases 120 and the indication of a concept 121. The related features 141 are features related to a concept which is described by the indication of a concept 121. For example, if the indication of a concept 121 is a keyword, then the output of the related feature determination system 128 includes one or more keywords that are related to the keyword input into the related feature determination system 128. Examples of the one or more related keywords include synonyms for the keyword or other keywords describing the concept. For example, a set of documents are stored in the data source 110. A user searches the data source 110 for documents on a certain topic, such as COMPAQ laptops. The user is unaware that "COMPAQ" is abbreviated as "CPQ" in many of the documents in the data source 110. The user's query including "COMPAQ" is run through the system 100 to determine related keywords for keywords in the query, such as "COMPAQ". One of the related keywords determined by the system 100 includes "CPQ". A list of related keywords is determined by the related feature determination system 128, and a user, for example, selects one or more of the related keywords to be used in a query. The related feature determination system 128 is also operable to determine a single keyword for the indication of a concept 121.

FIG. 2 illustrates a block diagram of the related feature determination system 128, according to an embodiment. The related feature determination system 128 includes a classifier 130 for generating predictions 142 about the cases 120. Based on the predictions 142, a related feature determination engine 129 determines the related features related to a concept. In FIG. 2, the keyword 122 and a set of related keywords 123 are examples of the indication of a concept 121 shown in FIG. 1. Also, the related keywords 140 are an example of the related features 141 shown in FIG. 1. Thus, in FIG. 2, the related feature determination engine 129 determines related keywords 140 for the keyword 122. It will be apparent to one of ordinary skill in the art that the related feature determination engine 129 and more generally the related feature determination system 128 is operable to select related features other than keywords, such as multi-word phrases, lexicographically-stemmed words, etc.

The classifier 130 includes a classifier induced by any known induction algorithm, such as Naive Bayes, C4.5 decision trees, Support Vector Machines, and others. In a first phase, the classifier 130 is trained (i.e., induced) with a modified positive set 131 and possibly with a negative set 132 to distinguish the difference between cases associated with a concept, such as the keyword 122, and cases not associated with the concept. According to an embodiment, the trained classifier 130 is automatically induced from data, such as the modified positive set 131 and the negative set 132, for example, using known machine learning techniques which may include one or more of the induction algorithms listed above implemented with a computer system.

The modified positive set 131 includes cases from the cases 120 determined to include the keyword 122, but modified to have the keyword 122 blinded from the classifier 130. Some examples of blinding the keyword 122 from the classifier 130 include identifying a positive set of cases having the keyword 122 and removing the keyword 122 from the each of the positive cases to generate the modified set 131. In another example, the modified positive set 131 includes a positive set of cases including the keyword 122 and the classifier 130 is instructed to ignore the keyword 122 when being trained. The negative set 132 includes cases not including the keyword 122. The negative set 132 is optional when training the classifier 130.

In one embodiment, the related feature determination engine 129 determines the modified positive set 131 and the negative set 132 from the cases 120. The related feature determination engine 129 determines a positive set including the cases 120 having the keyword 122. For example, the data source 110 is part of a customer support system. The data source 110 stores short text entries describing customer problems. The keyword 122 is "COMPAQ". The related feature determination engine 129 identifies all the cases 120 including "COMPAQ". These cases are the positive set. The related feature determination engine 129 then removes the keyword 122 from the positive set to form the modified positive set 131. The negative set 132 includes the cases 120 not having the keyword 122. In another embodiment, instead of removing the keyword 122, the modified positive set 131 includes the set of positive cases and instructions for the classifier 130 to ignore the keyword 122 in the set of positive cases. In another embodiment, the modified positive set 131 is determined manually or by some other means.

In a second phase, after the classifier 130 is trained using at least the modified positive set 131 and optionally using the negative set 132, the classifier 130 is applied to the negative set 132 to determine predictions 142 of whether each case in the negative set 132 belongs to the positive class or the negative class. The positive class includes cases, predicted to belong under the identified concept, and the negative class includes cases, negative cases, predicted not to belong under the identified concept. The identified concept is the keyword 122.

The predictions 142 that are in the positive class are false positives, because the keyword 122 is not included in any of the cases in the negative set 132. However, the classifier 130 was trained using the modified positive set 131, so the classifier 130 is operable to identify positive cases without depending on the presence of the keyword 122. Thus, the related feature determination engine 129 determines a set of false positives 145 from the predictions 142. The set of false positives 145 includes the cases from the negative set 132 predicted by the classifier 130 to belong to the positive class, which includes cases related to the keyword 122.

As described above, the classifier 130 is trained with the modified positive set 131 and a negative set 132, which are determined by the feature determination engine 129. Then, in a second phase, after the classifier 130 is trained, the classifier 130 is applied to the negative set 132 to make the predictions 142 which are used to determine the related keywords 140. In another embodiment, the classifier 130 is trained on one negative set, and later the predictions 142 are made on a different negative set, with no overlap between the two negative sets. The second negative set is shown in FIG. 2 as negative set 133.

The predictions 142, for example, include binary predictions, such as determination that a case belongs to a particular category or a determination that a case does not belong to the category. Also, the predictions 142, for example, include scores that indicate the degree of confidence of the predictions of the classifier 130. For example, a higher score indicates that the classifier 130 is predicting more confidently that a case belongs to the positive class. Predictions having a score greater than a predetermined threshold are then used as the set of false positives 145. For example, the negative set 132 or 133 is applied to the classifier after being trained. The classifier 130 distinguishes between false positives and true negatives using machine learning. A false positive includes a case from the applied negative set that the classifier 130 predicts belongs to the positive class and a true negative includes a case from the applied negative set that the classifier 130 predicts belongs to the negative class. A score exceeding or equal to a threshold for a case is indicative of a false positive and a score falling below the threshold is indicative of a true negative. A score, for example, is a probability that a case is in the positive class or another measure of a degree of confidence that a case belongs to the positive class.

The related feature determination engine 129 determines the related keywords 140 from the set of false positives 145. In one embodiment, a feature selection algorithm 146 is used to select the related keywords 140. The inputs to the feature selection algorithm 146 include the set of false positives 145 and the set of predictions 142 that are negative (i.e., the negative set 132 minus the set of false positives 145, also known as the "true positives"). The feature selection algorithm 146 identifies the most predictive words characterizing the set of false positives 145. Then, one or more of these most predictive words are selected as the related keywords 140. Examples of a feature selection algorithm, include Information Gain, Chi-Squared, or Bi-Normal Separation. Also or alternatively, the feature selection algorithm 146 identifies one or more words frequently associated with the set of false positives 145. For example, the common word "the" is not considered as predictive as other words, such as "laptop" or "PDA", by the feature selection algorithm 146.

The word selected by the related feature determination engine 129 is included in the related keywords 140. For example, referring to our example above including "COMPAQ" as the keyword 122, the related feature determination engine 129 identifies "CPQ" as a word frequently associated with the cases comprising the set of false positives 145. Thus, the related feature determination engine 129 selects "CPQ" as the related keywords 140. CPQ, for example, is not a synonym widely used for COMPAQ. However, the people entering the data into the data source 110 commonly used this as a synonym. If a user desired to generate a report of all the customer support entries for COMPAQ products from the data source 110, many of the entries likely are not included in the report if CPQ was not included in the query. The synonym determination engine 129 is used to identify related keywords which, for example, are used to generate more complete reports. It will be apparent to one of ordinary skill in the art that the related feature determination engine 129 is operable to identify more than one related keywords 140 from the set of false positives 145. Furthermore, the related keywords 140 are not limited to synonyms of the keyword 122 and, for example, include other related words. For example, a related keyword to "browser" includes NETSCAPE or MOZILLA.

The keyword 122 is, for example, selected by a user. In alternative embodiments, the keyword 122 is selected automatically using a known feature selection algorithm. For example, consider the common task where a person is repeatedly performing searches to build a collection of documents that are related to a particular topic. In one embodiment, the keyword 122 is determined automatically by selecting from a log of search terms used in queries generated by the person to find appropriate cases for building the collection of documents.

In another embodiment, a known feature selection algorithm is used. The input to the feature selection algorithm includes a set of documents labeled as belonging to the document collection and a set of documents labeled as not belonging to the document collection. The output of the feature selection algorithm is a list of some of the most characteristic words associated with the collection of documents. One or more of these characteristic words are used as the keyword 122 in independent runs of the related feature determination system 128.

In another embodiment, instead of using a single keyword 122, a set of related keywords 123 shown in FIG. 2, such as a query (e.g., "(sofa or couch)"), is used as the keyword input to the related feature determination engine 129. The set of keywords 123 is, for example, input by the user. Alternately, a known source of synonyms, such as a thesaurus, is used to determine the set of keywords 123. The related feature determination engine 129 determines the positive set including the cases 120 having at least one of the set of keywords 123. The related feature determination engine 129 then determines the modified positive set 131, for example, by removing all of the keywords in the set of related keywords 123 from the positive set to form the modified positive set 131. The negative set 132 includes the cases 120 not having any of the keywords in the set of related keywords 123. Then, the related feature determination engine 129 determines the related keywords 140 as described above. It will be apparent to one of ordinary skill in the art that the steps described above for determining additional related words for known set of related words are repeated as needed.

In one embodiment, the system shown in FIG. 2 is recursive. For example, the related keywords 140 are used to determine a new modified positive set 131 not including any of the related keywords 140. The classifier 130 is trained again using the modified positive set not including any of the related keywords 140. This, for example, includes inducing a second classifier, whereby the classifier 130 represents one or more classifiers when the system is applied in a recursive manner. Then, a negative set is applied to the classifier 130 to determine more related keywords. This process is, for example, repeated until no more related keywords are found or the process is, for example, repeated a lesser number of times, such as a predetermined number of times or until the number of related keywords found falls below a threshold.

Figure 3:
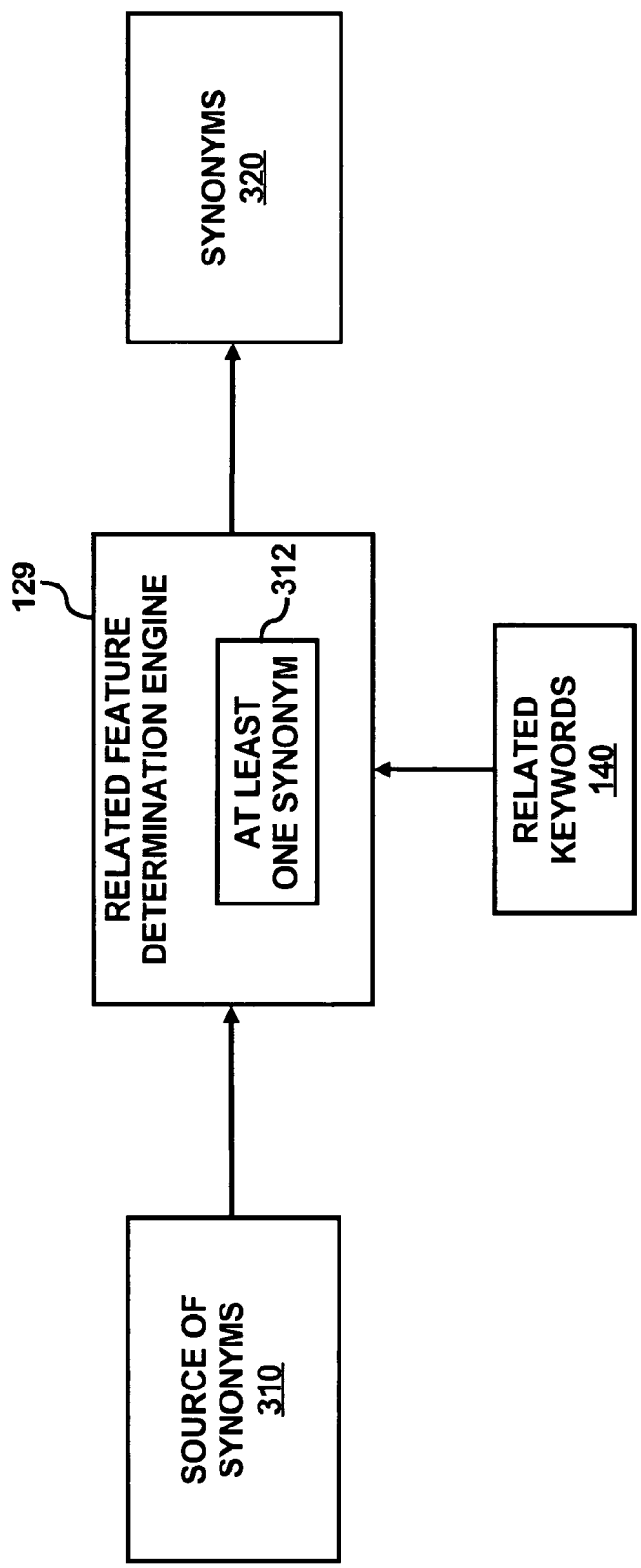
FIG. 3 illustrates using a known source of synonyms in the related feature determination system, according to yet another embodiment.

According to another embodiment, a known source of synonyms is used in conjunction with the related feature determination system 128 to determine the related keywords 140 shown in FIG. 2. FIG. 3 illustrates using a known source of synonyms 310 in the related feature determination system 128 shown in FIG. 2 to determine one or more related keywords for the keyword 122. Examples of a known source of synonyms are a thesaurus or a dictionary. Many of the details of FIG. 2 are not repeated in FIG. 3 for purposes of illustrating the embodiment. In the second phase, after the related feature determination engine 129 determines the related keywords 140 from the set of false positives 145, the related feature determination engine 129 identifies at least one synonym 312 for the keyword 122 from the source of synonyms 410. Then, the at least one synonym 312 is, for example, used to verify that the related keywords 140 are accurate, such as if a match exists between the related keywords 140 and the at least one synonym 412. A match exists, for example, if a related keyword from the related keywords 140 is the same or substantially the same as a synonym from the at least one synonym 412. Substantially the same, for example, includes the same words but provided in different tenses. In another example, either the keyword or the synonym is a root word of the other. In yet another example, the keyword and the synonym are the same but they are spelled differently. For example, in some instances there is more than one correct spelling. If a match exists then the matching related keyword is considered a synonym. The matching related keywords are shown as synonyms 320 in FIG. 3. Alternatively, if the related keywords 140 include a plurality of synonyms, then the related feature determination engine 129 removes any of the synonyms in the related keywords 140 that match the at least one synonym 412. Thus, the remainder of related keywords 140 is a set of previously unknown synonyms, which, for example, is also included in the synonyms 320 shown in FIG. 3.

In another embodiment of the related feature determination system 128 of FIG. 1, context sensitivity is used and is operable to improve the accuracy of the related keywords 140. For example, several of the cases 120 include the abbreviation "HP". This abbreviation, for example, represents two different meanings in the cases 120, such as HEWLETT-PACKARD in some cases and horsepower in others.

Figure 4:
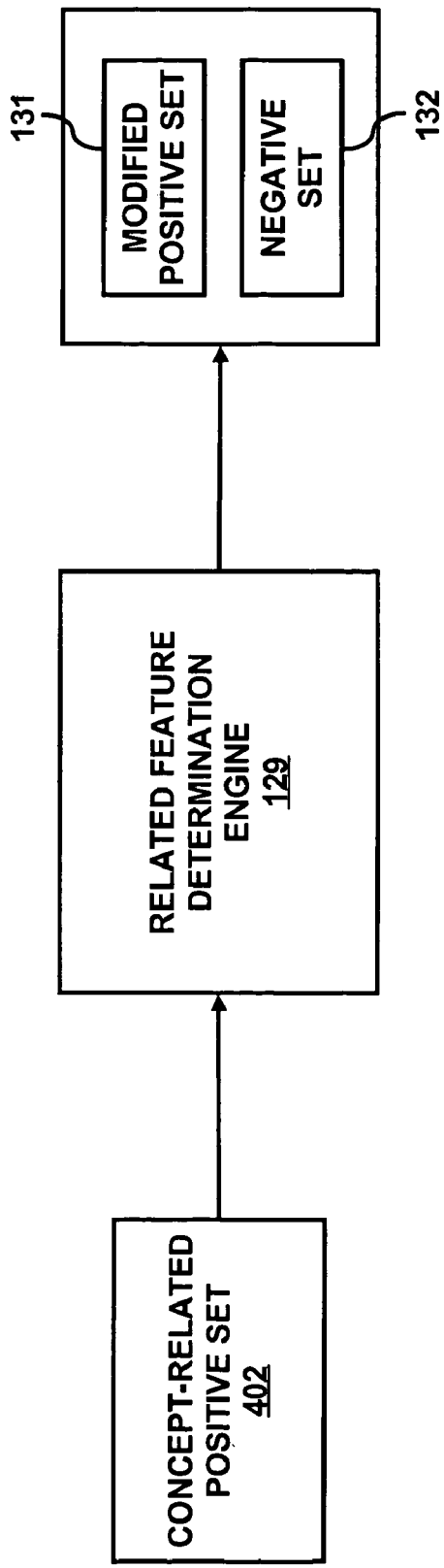
FIG. 4 illustrates using a concept-related positive set in the related feature determination system, according to an embodiment.

In this embodiment, the keyword 122 shown in FIG. 2 is selected, such as "HP". A concept related to the keyword 122 is determined, such as "outboard motors", and a set of positive cases 120 are selected that are related to this concept. This is illustrated in FIG. 4, which shows a concept-related positive set 402 input into the related feature determination engine 129. A user, for example, determines the concept-related positive set 402. For example, a user runs a query on a database storing the cases 120 to identify the cases related to outboard motors. The modified positive set 131 includes the cases from the concept-related positive set 402 originally having the keyword 122, but the keyword is removed by the related feature determination engine 129. The negative set 131 includes the cases from the concept-related positive set 402 not including the keyword 122. Then, the negative set 132 is, for example, applied to the classifier 130 as shown in FIG. 2 to determine the related keywords 140. Alternatively, a second set 133 shown in FIG. 2 is, for example, applied to the classifier 130 to determine the related keywords 140.

Figure 5:
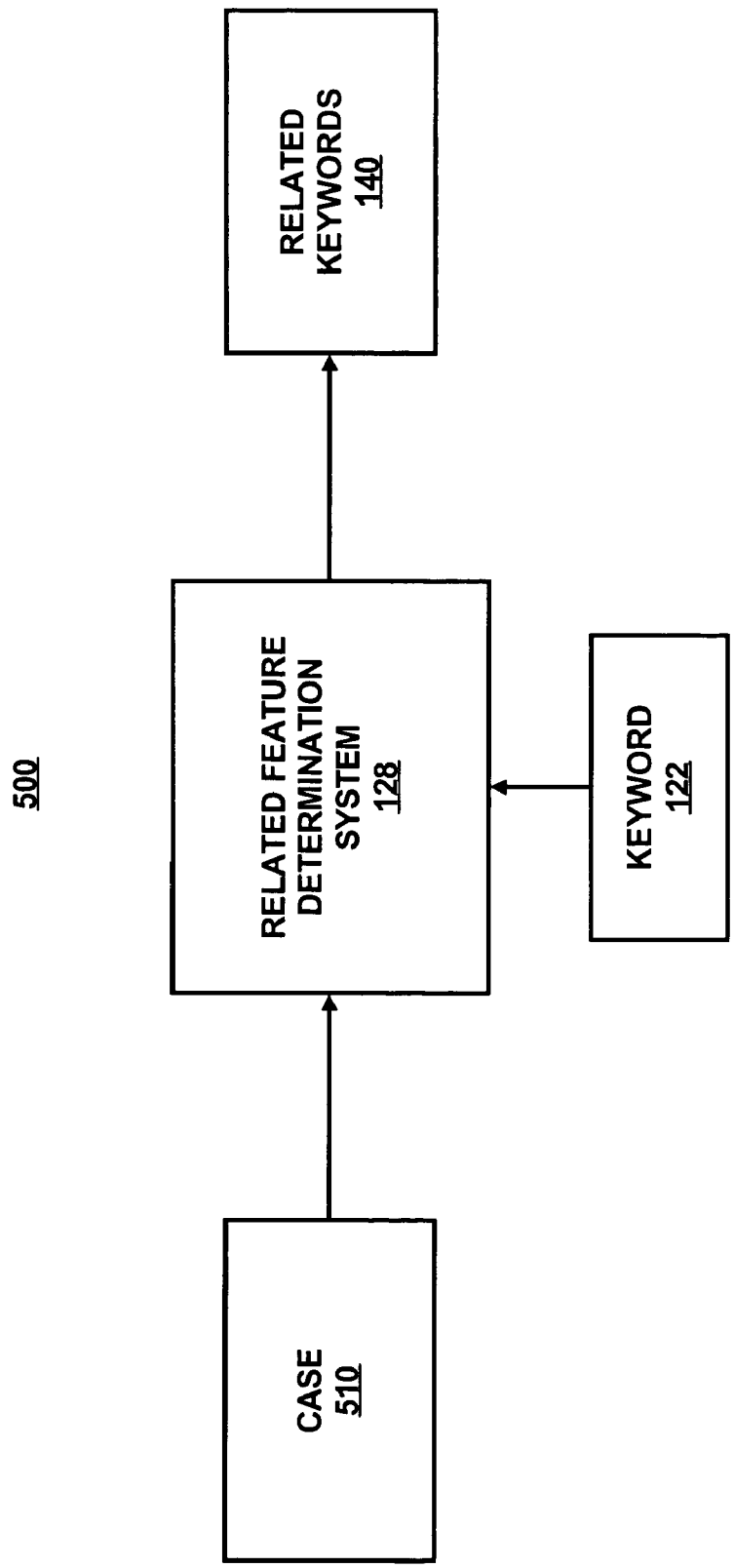
FIG. 5 illustrates using the related feature determination system to determine a related feature for a case, according to an embodiment.

In another embodiment, the related feature determination system 128 shown in FIGS. 1 and 2 is used to provide a meaning for a keyword in a case 510 shown in FIG. 5. For example, a user is reading a case from the cases 120 and comes across a word or acronym, such as "CPQ" unknown to the user. The related feature determination system 128 determines related keywords 140, such as "COMPAQ", for the unknown term, which is the keyword 122, as described above with respect to FIG. 2. An unknown term, for example, is a word, phrase, one or more symbols, or an acronym. In one example, the unknown term is a term for which a user needs to determine a meaning. The related keywords 140 are presented to the user to aid their understanding of the unknown term. The related keywords 140 for example include a word or phrase or symbols related to the unknown term. In one embodiment, the system shown in FIG. 5 is embodied in a text editor 500, which is, for example, part of a word processor or another program. The case 510 is, for example, substantially any type of data. If the system shown in FIG. 5 is embodied in a text editor, the case 510 likely includes text, such as a document, short text entries, etc. In one example, the cases 120 including the case 510 include database entries for a text field. For example, the database includes a plurality of fields for describing a document, and the text field is one of the plurality of fields.

Figure 6:
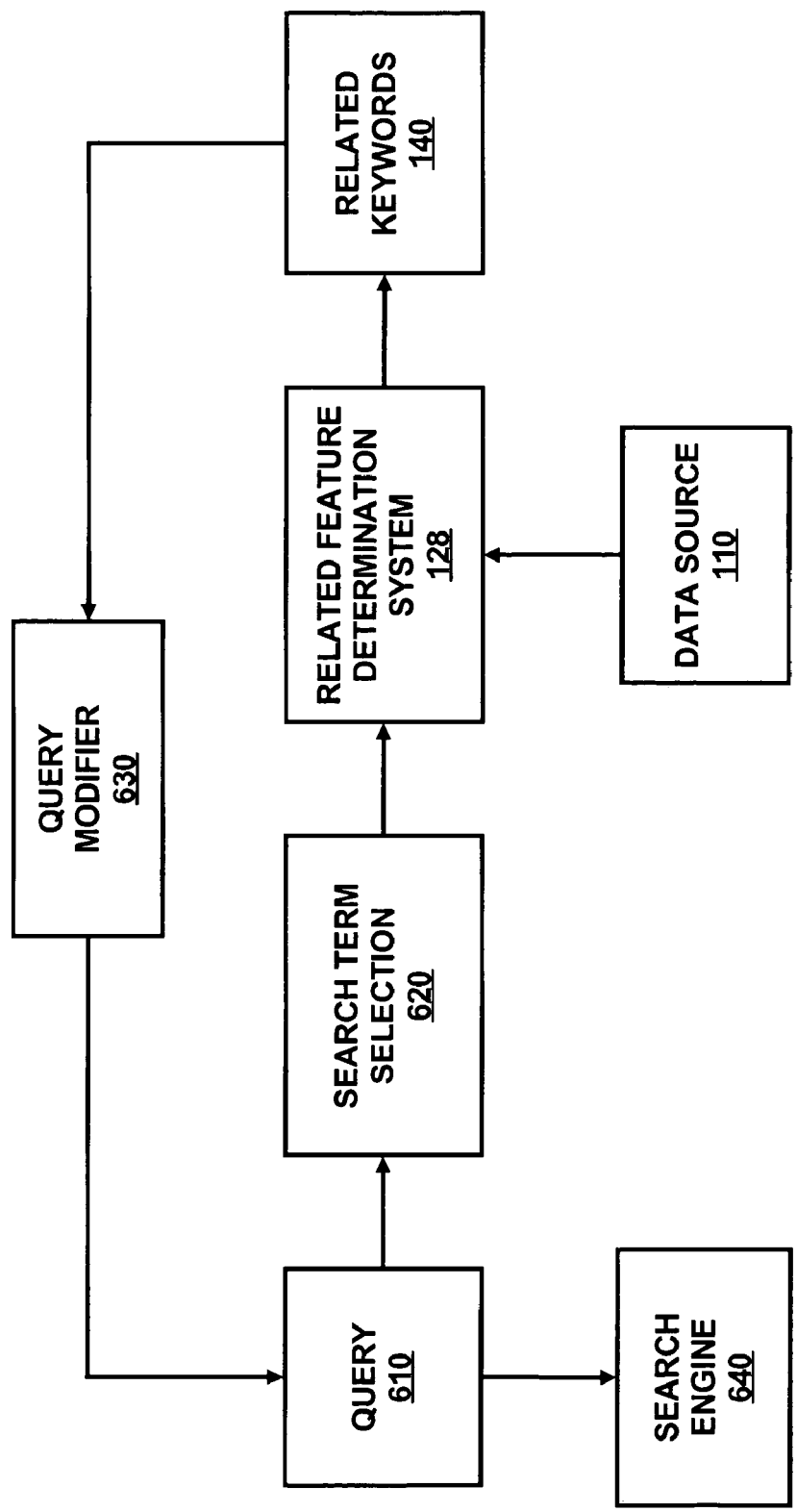
FIG. 6 illustrates a system for determining a related keyword for a search term in a query, according to an embodiment.

FIG. 6 illustrates another embodiment using the related feature determination system 128 shown in FIGS. 1 and 2 to determine related keywords for search terms. A query 610 is identified. The query 610, for example, is input by a user. A search term selection module 620 identifies one or more search terms from the query that will be used as keywords for determining related keywords. Alternatively, one or more search terms is selected by a user for determining synonyms.

The related feature determination system 128 determines one or more related keywords 140 for each search term selected by the search term selection module 620. The query modifier module 630 adds the related keywords 140 for each selected search term to the query 610. The query 610, including the related keywords 140, is then submitted to the search engine 640. In one example, the user has the option of selecting one or more of the related keywords 140 to use in the query 610, so all the related keywords 140 possibly are not used in the query 610. For example, the related keywords 140 are displayed to the user via the interface for entering the query 610, and the user selects one or more of the related keywords 140 to include in the query 610. Alternatively, the related keywords 140 are automatically be included in the query 610.

Figure 7:
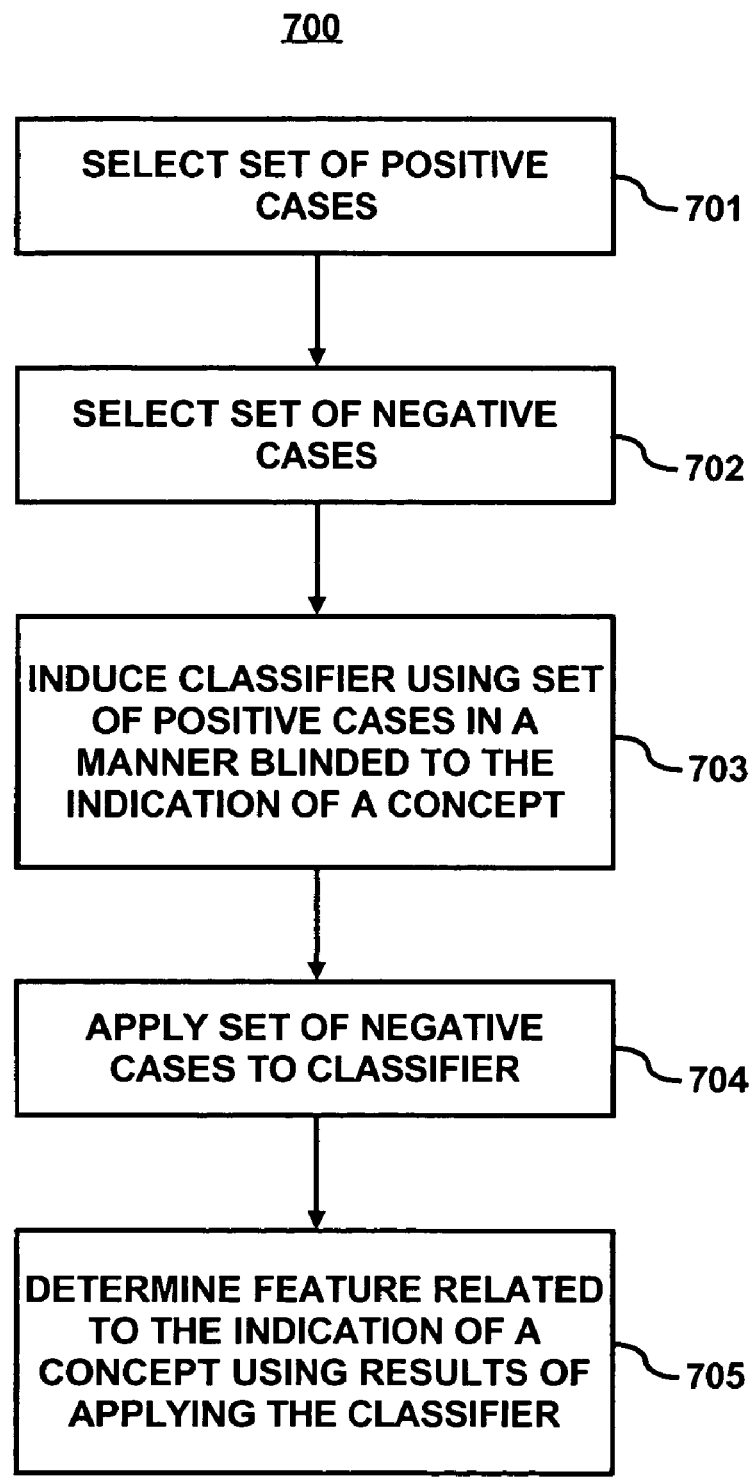
FIG. 7 illustrates a flow chart of a method for determining a related feature, according to an embodiment.

FIG. 7 illustrates a flow chart of a method 700 for determining a synonym for a keyword, according to an embodiment. The method 700 is described with respect to FIGS. 1-2 by way of example and not limitation. At step 701, a set of positive cases is selected using the indication of a concept 121 shown in FIG. 1. At step 702, a set of negative cases, such as the negative set 132 or 133 shown in FIG. 2, is selected using the indication of a concept 121. An example of the indication of a concept 121 is the keyword 122 shown in FIG. 2. In different embodiments, the keyword 122 is a search term in a query or an unknown term, for example, for which a user is trying to determine a meaning. At step 703, the classifier 130 is induced for a concept using the set of positive cases in a manner blinded to the indication of a concept. For example, the concept is a concept represented by the keyword 122. The classifier 130 is trained using the modified positive set 131. The modified positive set 131 blinds the classifier 130 to the indication of a concept. For example, the keyword 122 is removed from the positive set to create the modified positive set 131 or the classifier is instructed to ignore the keyword 122 when being trained using the positive set. At step 704, the set of negative cases, such as the negative set 132 or 133 shown in FIG. 2, is applied to the classifier 130. At step 705, a feature related to the indication of a concept is determined using results of the applying the trained classifier 130. For example, the related feature determination engine 129 determines the related keywords 140 based on results, which, for example, includes the predictions 142 or an output of an algorithm using the predictions 142.

In other embodiments, modifications to the method 700 are made as would be apparent to one of ordinary skill in the art. For example, steps 701-702 are performed substantially simultaneously or in different orders or step 702 is performed after step 703.

FIG. 8 illustrates an example of a computer system 800, which is, for example, used for executing the related feature determination system 128 shown in FIG. 1. The related feature determination system 128 includes hardware, software, or a combination of hardware and software. The computer system 800 includes one or more processors, such as processor 803, providing an execution platform for executing software, such as classifiers and other modules. Commands and data from the processor 803 are communicated over a communication bus 804. The computer system 800 also includes a main memory 806, such as a Random Access Memory (RAM), where software is, for example, resident during runtime, and a secondary memory 808. The secondary memory 808 includes, for example, a hard disk drive or other type of storage device. Other examples of the secondary memory 808 include ROM (read only memory), EPROM (erasable, programmable ROM), EEPROM (electrically erasable, programmable ROM).

The computer system 800 includes user interfaces comprising one or more input devices 818, such as a keyboard, a mouse, a stylus, and the like. The display adapter 822 interfaces with the communication bus 804 and the display 820 and receives display data from the processor 803 and converts the display data into display commands for the display 830. The input devices 818, the display 830, and the display adapter 822 are optional. A network interface 830 is provided for communicating with other computer systems. It will be apparent to one of ordinary skill in the art that the computer system 800 more or less features depending on the complexity of system needed for running the classifiers.

According to an embodiment, the steps of the method 700 are implemented as software embedded on a computer readable medium, such as the memory 806 and/or 808, and executed on the computer system 800, for example, by the processor 803.

The steps are embodied by a computer program, which, for example, exists in a one or more of a variety of forms, both active and inactive. For example, the steps exist as software program(s) comprised of program instructions in source code, object code, executable code or other formats for performing some of the steps. Any of the above are, for example, embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program are configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below are performed by an electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of determining a feature related to an indication of a concept, the method comprising:
   selecting a set of positive cases using the indication of the concept, wherein the indication of the concept is a keyword;
   selecting a set of negative cases using the indication of the concept;
   training, by a computer system, a classifier for the concept using the set of positive cases in a manner blinded to the indication of the concept;
   applying the classifier to the set of negative cases;
   determining a feature related to the indication of the concept using results of the applying of the classifier, wherein the feature related to the indication of the concept is a related keyword to the indication of the concept; and
   generating a query including at least one of the keyword and the related keyword to perform a search.

2. The method of claim 1, wherein selecting a set of positive cases further comprises:
   identifying a set of cases including the keyword from a plurality of cases.

3. The method of claim 2, wherein the plurality of cases are database entries, and wherein the database entries have a text field, and wherein the identifying a set of cases including the keyword from a plurality of cases further comprises:
   determining whether the text field contains the keyword.

4. The method of claim 3, wherein the database comprises a plurality of fields for describing a document, and the text field is one of the plurality of fields.

5. The method of claim 1, wherein the indication of the concept is a plurality of keywords, and the selecting a set of positive cases further comprises:
   identifying a set of cases including at least one of the plurality of keywords; and
   the selecting a set of negative cases further comprises identifying a set of cases not including any of the plurality of keywords from a plurality of cases.

6. The method of claim 5, wherein one of the plurality of keywords is determined from a source of known synonyms of another one of the plurality of keywords.

7. The method of claim 1, further comprising:
   determining a synonym of the keyword from a source of known synonyms; and
   determining whether a match exists between the related keyword and the synonym from the source of known synonyms.

8. The method of claim 1, wherein determining a feature related to the indication of the concept further comprises:
   identifying false positives from the results of the classifier;
   identifying true negatives from the results of the classifier; and
   selecting a feature indicative of differences between the false positives and the true negatives.

9. The method of claim 8, wherein the results of the applying the classifier includes a score for a case, and wherein determining a feature related to the indication of the concept using results of the applying the classifier further comprises:
   comparing the score for a case to a threshold;
   wherein identifying false positives further comprises identifying cases from the negative set having a score exceeding the threshold; and
   wherein identifying true negatives further comprises identifying cases from the negative set having a score not exceeding the threshold.

10. The method of claim 8, wherein selecting a feature further comprises:
    using a feature selection method.

11. The method of claim 10, wherein the feature selection method is one of information gain; mutual information, bi-normal separation, term frequency counting, determining a word frequency, and chi-squared.

12. The method of claim 1, wherein the training of a classifier further comprises:
    removing the indication of the concept from the set of positive cases to create a modified positive set of cases;
    selecting a second set of negative cases; and
    using machine-learning to distinguish the modified positive set of cases from the second set of negative cases.

13. The method of claim 12, wherein the second set of negative cases shares at least one case with the first set of negative cases.

14. The method of claim 12, wherein the second set of negative cases does not include any cases from the set of negative cases.

15. The method of claim 1, further comprising:
    identifying a second set of positive cases using the feature related to the indication of the concept;
    identifying a second set of negative cases using the indication of the concept and the feature related to the indication of the concept;

training a second classifier for the concept using the second set of positive cases in a manner blinded to the indication of the concept and blinded to the feature related to the indication of the concept;

applying the second classifier to the second set of negative cases; and determining a second feature related to the indication of the concept using the results of the applying the second classifier.

16. The method of claim 1, wherein the indication of the concept includes a search term for performing a search, and the selecting a set of positive cases using the indication of the concept further comprises performing a search among a plurality of cases using the search term.

17. The method of claim 16, wherein the feature related to the indication of the concept is a second search term, and further comprising:

presenting the second search term, such that the second search term is operable to be used for performing a second search.

18. The method of claim 16, wherein the feature related to the indication of the concept is a second search term, and further comprising:

performing a second search among a plurality of cases using the second search term; and presenting a case resulting from the second search.

19. The method of claim 1, further comprising determining the indication of the concept from a log of search terms.

20. The method of claim 19, wherein determining the indication of the concept from a log of search terms further comprises:

applying a feature selection method to a log of search terms.

21. The method of claim 1, wherein selecting a set of positive cases using the indication of the concept further comprises:

selecting a set of positive cases that are context sensitive to the indication of the concept.

22. The method of claim 1, wherein the indication of the concept includes text in a document, and the feature is text related to the text from the document.

23. The method of claim 22, further comprising:

presenting the text related to the text from the document in a text editor displaying the text from the document.

24. The method of claim 1, wherein the keyword is a keyword in a query, and the feature related to the indication of the concept comprises at least one keyword related to the keyword in the query, wherein the at least one keyword is operable to be used in the query.

25. The method of claim 1, wherein the indication of the concept is an unknown term, and the feature related to the indication of the concept is at least one word related to the unknown term.

26. An apparatus comprising:

a classifier executed by a computer system to classify cases based on a concept, wherein the classifier is trained using a set of positive cases such that the classifier is blinded to an indication of the concept when being trained and the indication of the concept is one or more keywords;

a feature relation determination engine determining a feature related to the indication of the concept based on results of applying the classifier to a negative set, wherein the feature related to the indication of the concept is at least one related keyword that is related to the indication of the concept; and a query modifier creating a query using the at least one related keyword.

27. The apparatus of claim 26, wherein the negative set does not include the indication of the concept.

28. The apparatus of claim 26, wherein the query created by the query modifier is a second query, the apparatus further comprising:

a search term selection module operable to select the indication of the concept from a first query.

29. An apparatus comprising:

a classifier means, including a computer system, for classifying cases based on a concept, wherein the classifier means is trained using a set of positive cases such that the classifier means is blinded to an indication of the concept when being trained and the indication of the concept is at least one keyword;

a feature relation determination engine means for determining a feature related to the indication of the concept based on results of applying the classifier means to a negative set, wherein the feature related to the indication of the concept is at least one related keyword that is related to the indication of the concept; and a query modifier means for creating a query using the at least one related keyword.

30. A non-transitory computer readable medium storing a computer program comprising code that when executed causes a computer to perform the following:

selecting a set of positive cases from a plurality of cases using an indication of a concept, wherein the indication of a concept is a keyword;

selecting a set of negative cases from a plurality of cases using the indication of the concept;

training, by the computer, a classifier for the concept using the set of positive cases in a manner blinded to the indication of the concept;

applying the classifier to the set of negative cases;

determining a feature related to the indication of the concept using the results of the applying of the classifier, wherein the feature related to the indication of the concept is a related keyword to the indication of the concept; and generating a query including at least one of the keyword and the related keyword to perform a search.

31. A method comprising:

selecting a set of positive cases using an indication of the concept, wherein the indication of the concept is an unknown term and the unknown term is a term for which a user needs to determine a meaning;

selecting a set of negative cases using the indication of the concept;

training, by a computer system, a classifier for the concept using the set of positive cases in a manner blinded to the indication of the concept;

applying the classifier to the set of negative cases;

determining at least one word or symbol related to the indication of the concept using results of the applying of the classifier; and presenting the one word or symbol related to the unknown term to aid the user in their understanding of the unknown term.

32. A method comprising:

selecting a set of positive cases using an indication of a concept, wherein the indication of a concept is a keyword;

selecting a set of negative cases using the indication of the concept;

removing the indication of the concept from the set of positive cases to create a modified positive set of cases;

training, by a computer system, a classifier operable to distinguish the modified positive set of cases from the set of negative cases;

applying the classifier to the set of negative cases;

identifying false positives from results of applying the classifier to the set of negative cases;

identifying true negatives from the results;

selecting a feature indicative of differences between the false positives and the true negatives, wherein the feature is related to the indication of the concept is a related keyword to the indication of the concept; and generating a query including at least one of the keyword and the related keyword to perform a search.

33. A method of determining a feature related to an indication of a concept, the method comprising:

storing a set of positive cases, wherein the positive cases are selected using the indication of the concept;

storing a set of negative cases, wherein the negative cases are selected using the indication of the concept;

training, by a computer system, a classifier for the concept using the set of positive cases in a manner blinded to the indication of the concept;

applying the classifier to the set of negative cases; and determining a feature related to the indication of the concept using results of the applying of the classifier.

34. The method of claim 33, comprising generating a query including the indication of the concept and the feature to perform a search.

* * * * *